(12) United States Patent
Knapp

(10) Patent No.: US 9,054,509 B2
(45) Date of Patent: Jun. 9, 2015

(54) WIRE PROTECTIVE INSERT SLEEVE FOR ELECTRICAL SWITCHES, RECEPTACLES AND JUNCTION BOXES

(76) Inventor: Andrew Knapp, Shorewood, IL (US)

( * ) Notice: Subject to any disclaimer, the term of this patent is extended or adjusted under 35 U.S.C. 154(b) by 0 days.

(21) Appl. No.: 13/051,427

(22) Filed: Mar. 18, 2011

(65) Prior Publication Data

US 2011/0226504 A1   Sep. 22, 2011

Related U.S. Application Data

(60) Provisional application No. 61/340,490, filed on Mar. 18, 2010.

(51) Int. Cl.
| | | |
|---|---|---|
| F16B 39/284 | (2006.01) | |
| H02G 3/08 | (2006.01) | |
| F16B 37/04 | (2006.01) | |
| F16B 37/06 | (2006.01) | |
| F16B 15/00 | (2006.01) | |
| F16B 19/00 | (2006.01) | |
| F16B 39/04 | (2006.01) | |

(52) U.S. Cl.
CPC .............. *H02G 3/081* (2013.01); *F16B 37/045* (2013.01); *F16B 37/041* (2013.01); *F16B 37/044* (2013.01); *F16B 37/04* (2013.01); *F16B 37/068* (2013.01); *F16B 37/043* (2013.01)

(58) Field of Classification Search
CPC ...... F16B 37/04; F16B 37/041; F16B 37/043; F16B 37/044; F16B 37/045; F16B 37/046; F16B 37/068
USPC ......... 411/171, 174, 112, 339, 356, 357, 360, 411/361, 213, 320, 321, 428, 429, 970; 174/50; 439/542, 543, 544, 550, 551, 439/552, 553, 555

See application file for complete search history.

(56) References Cited

U.S. PATENT DOCUMENTS

| | | | |
|---|---|---|---|
| 4,167,648 A | 9/1979 | Lockwood | |
| 4,434,597 A | 3/1984 | Fischer | |
| 4,824,390 A * | 4/1989 | Crane et al. | 439/271 |
| 4,837,406 A | 6/1989 | Emmons | |
| 4,880,387 A | 11/1989 | Stikeleather et al. | |
| 4,909,692 A | 3/1990 | Hendren | |
| 5,057,649 A | 10/1991 | Ring | |
| 5,102,347 A * | 4/1992 | Cote et al. | 439/412 |
| 5,273,384 A * | 12/1993 | Dunbar | 411/428 |
| 5,538,377 A * | 7/1996 | Stewart et al. | 411/174 |
| 5,965,845 A | 10/1999 | Reiker | |
| 6,198,045 B1 | 3/2001 | Roesch | |
| 6,207,898 B1 | 3/2001 | Reiker | |
| 6,281,439 B1 * | 8/2001 | Reiker | 174/62 |
| 6,357,980 B1 * | 3/2002 | Lansinger | 411/174 |
| 6,726,498 B2 | 4/2004 | Pogliani | |
| 6,753,471 B2 | 6/2004 | Johnson et al. | |
| 6,840,800 B2 * | 1/2005 | Kidman | 439/535 |
| 7,048,575 B2 | 5/2006 | Kidman | |
| 7,306,482 B1 | 12/2007 | Kidman | |
| 7,654,783 B2 * | 2/2010 | Giraud | 411/174 |
| 2006/0004366 A1 | 1/2006 | Cerul | |

* cited by examiner

*Primary Examiner* — Hoa C Nguyen
*Assistant Examiner* — Binh Tran
(74) *Attorney, Agent, or Firm* — Factor Intellectual Property Law Group, Ltd.

(57) ABSTRACT

A wire protecting device for boxes containing electrical wires, the device having an insert sleeve having a substantially solid exterior and a penetrable interior and a structure for attaching the insert sleeve proximate a fastener hole capable of receiving a fastener which extends in a longitudinal direction into the box when in an at least partially fastened position.

24 Claims, 4 Drawing Sheets

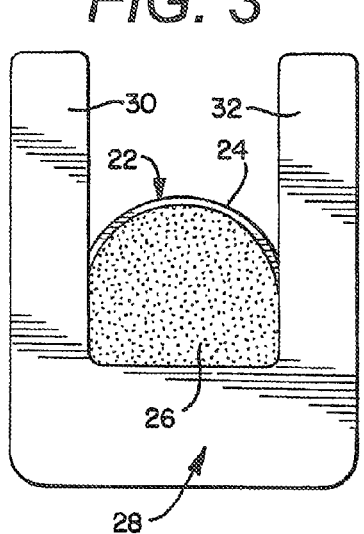
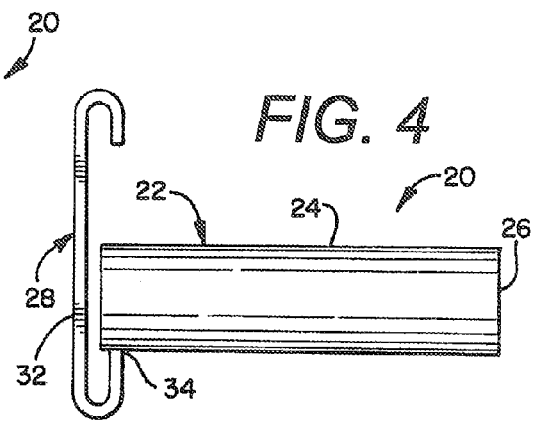
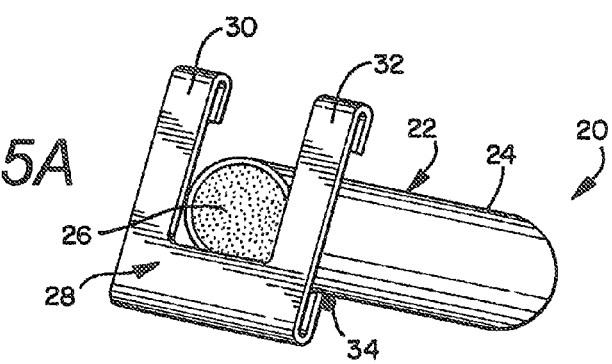
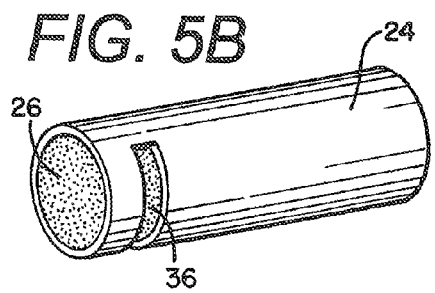
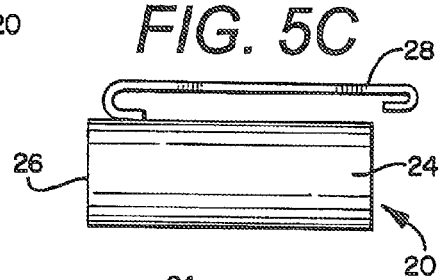
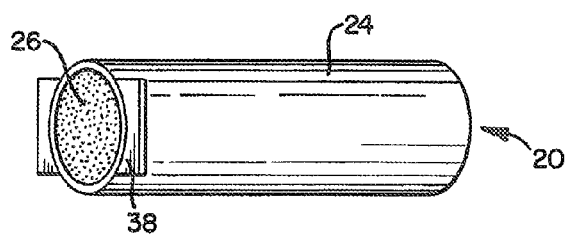

WIRE PROTECTIVE INSERT SLEEVE FOR ELECTRICAL SWITCHES, RECEPTACLES AND JUNCTION BOXES

RELATED APPLICATIONS

This application claims priority to U.S. Provisional Patent Application No. 61/340,490 filed Mar. 18, 2010, the contents of which are incorporated herein by reference.

FIELD OF THE INVENTION

The present invention relates generally to electrical wiring systems and devices; and more particularly to a device and method for improving the safety associated with wiring located within electrical receptacles, electrical junction boxes, over-current protection enclosures, outlets and similar items well known within the art.

BACKGROUND OF THE INVENTION

For many decades electrical power has been provided in structures through wires run into an over-current protection enclosure located in the structure, and then branching outward from the over-current protection enclosure to dozens or hundreds of receptacles, switches and outlet boxes of various types. Some of these electrical junctions are typified within prior art patents such as U.S. Pat. No. 3,609,647. These switches, receptacles and boxes contain varying numbers of insulated electrical wires of varying lengths by the time the installation is complete. Often times these various boxes contain a high density of wires within the confined area. After all of the necessary wires are within these boxes, the electrician must mount a switch, or electrical receptacle or other "face plate" or "plaster ring" type device on or in said box using screws threaded through preset holes. The threaded portion of the screw after extending toward and into the interior of the box often results in inadvertent contact with the wires located therein. Although most screws for this purpose have blunted tips, these metallic screws and their sharp metal threads have a propensity for cutting into the insulation of one or more wires within the void, sometimes causing the wire to wrap around the screw. This may cause an electrical arcing that further erodes the insulation of one or more wires, or it may cause a constant or intermittent electrical short circuit. Both of these outcomes create the potential for a dangerous fire. While, these electrical short circuits may, at times, be detected, they are very time consuming to find and repair, requiring many or most receptacles and switches to be disassembled and visually inspected. At other times, the wire insulation damaged by the sharp screw threads (or other fastening device) may function normally for weeks or months until a particularly heavy load is placed upon them. In all, the simple abrasion of wires caused by these mounting screws or other securing elements costs millions of dollars annually in lost productivity and countless millions in electrical fires.

Good trade practices as well as upcoming safety standards require professionals within the electrical trades to adopt economical solutions to these problems. Ideal solutions will enable professionals to easily incorporate the component or method to the normal installation procedure for new construction or remodeling. Retrofits to bring older electrical boxes up to modern code should likewise be cost effective and as simple as possible.

The resultant challenges call for a solution that solves wire protection/abrading issues in a wide assortment of electrical installations both domestically and abroad. Additionally, a solution must be simple and sufficiently cost effective to encourage the wide adoption even by home-owners and other non-professional installers. Such solutions must be suitable for retrofits without heavy reconstruction demands allowing all updated receptacles, switches and the like to gain the safety benefits of the invention at a minimal investment of time and money.

It is, therefore, an object of the present invention to provide a simple hardware solution that effectively shields all wires within an electrical box from abrasion/damage of screw threads and/or screw tips (as well as the shanks and tips of other fastening devices) within an electrical receptacle, switch, or similar junction no matter how crowded said junction is with insulated wiring.

It is also an object of the present invention to provide a protective structure suitable for new construction and the upgrade or remodel of existing structures with a minimum of construction activity, and further allows even home owners and other non-professional installers to utilize said benefits of the invention thereby overcoming some of the disadvantages of prior art.

It is still further an object of the present invention to provide a protective structure that can be adapted for use with existing structures by the manufacturer of same, as well as by electricians and handymen alike.

These and other objects of the present invention will become apparent to those having ordinary skill in the art in view of the present specification, claims, and drawings.

SUMMARY OF THE INVENTION

The present invention is directed to a protective structure, tube, sleeve, or sheathing element for use in existing electrical receptacles and junction boxes. While the invention generally applies to an electrical receptacle unit or wall outlet unit, it is also intended to apply to light fixtures, light switches, rheostats, over-current protection enclosures, and any similar device which houses electrically conductive wiring. Essentially, the present invention is intended for use in any electrical housing containing wires that are subject to wire abrasion issues by the entry of a fastener such as a securing screw, bolt or other fastening device. As is discussed herein, this improvement may be added to existing boxes, receptacles, etc., may replace portions of existing boxes, receptacles, etc., and/or may be incorporated into newly manufactured boxes, receptacles, etc. in the future.

As will be explained in greater detail, the present invention provides a protective structure, tube, sleeve, or sheathing element which will affix to any electrical box, plaster ring, mud ring or component having a fastening hole located therein, wherein the fastening hole would otherwise result in exposure of at least a portion of the shank of the fastening device after the tip of same has passed through said hole. The protective structure is then capable of at least partially shielding the shank and/or threads of any standard screw, bolt, or other fastening element, thus protecting all wires within said box from any abrasion or adverse contact therewith.

According to one aspect of the invention, said protective structure, tube, sleeve, or sheathing element may be represented as an "insert sleeve" having a penetrable interior and a clip or other attachment means for attaching the sheathing element to a surface proximate a fastener hole located within an electrical box. According to one aspect of the invention, the sheathing element is also capable of attachment to a component located within the box, such as a light switch or electrical outlet. It should be appreciated by those having ordinary skill in the art that the sheathing element is capable of attachment anywhere within the box wherein a screw or other fastening element may enter into an area housing any electrical wiring. Once secured in place, the penetrable interior of the insert sleeve should be positioned proximate at least one preset fastener hole in the box, a component within the box and/or face plate attached to the box, and extend into the box or receptacle in a direction corresponding to the longitudinal axis of the fastener in such a manner that, in a preferred embodiment, substantially all of the otherwise exposed shank of the fastener is enshrouded by the sleeve. Thus, said sheathing element can be easily retrofitted to nearly any electrical junction box, receptacle, electrical switch, etc., in order to provide protective sheathing of any fasteners that may otherwise project into an area containing electrical wires.

According to another aspect of the invention, the protective structure or wire protecting sheathing element may be manufactured as a portion of the electrical junction box, or as a portion of, or attachment to, the "face plate," plaster ring or mud ring of the junction box or some other component located within the box. In all embodiments the protective structure (sometimes referred to as an "insert sleeve") will provide a shield between the threads or shanks of any intruding fastening member and any wires present within the junction box. According to one aspect of the invention, the protective structure or insert sleeve of the invention may also limit the overall length of a fastener introduced to the electrical junction box. By utilizing a protective structure or insert sleeve terminating with a closed end at a particular length, it will effectively limit a fastener's penetration depth, providing additional area for wiring and future modifications to the box or receptacle, as well as ensuring the tip of the fastening element does not come into contact with any wires.

In yet another aspect of the invention, a tension clipping element may be employed to secure the protective structure or insert sleeve in place on a variety of differing electrical box surfaces, face plates or components and interpose a protective structure or an insert sleeve in line with any and all fastener paths. The clip element will allow for the protective structure or insert sleeve to be positioned adjacent any fastener hole within a box and will keep the protective structure or insert sleeve fixed in place and avoid rotating or displacement with the insertion of any fastening element. In addition, such a clipped structure will enable use of a fastening element with the same outer diameter and/or thread pattern as would otherwise be used with the commercial electrical box's fastening holes.

According to another aspect of the invention, the protective structure or insert sleeve may include geometry capable of cooperating with a geometry located in an electrical box or on a component with the electrical box to affix proximate a fastener hole. In still another aspect of the invention, the protective structure or insert sleeve may be directly affixed to the box or a component therein through soldering, welding, use of an adhesive, biasing means or any similar process which permanently or removably affixes the protective structure or insert sleeve directly to a surface proximate a fastener hole.

According to another aspect of the invention, a kit for housing electrical wires or components is provided. The kit includes a box having at least one fastener hole through which a fastener may attach, at least one fastener for fastening an additional component, like for example a top or lid to the box, and a wire protecting structure having an exterior, a penetrable interior, and an attachment element for attaching to the box proximate the one fastener hole. The wire protecting structure is preferably tubular in shape, however may be embodied in any shape required for a specific fastener or box included with the kit. The attachment element may be clip attached to the wire protecting structure and may further include a hinge and/or a clip. The clip may likewise be formed as an integral part of the exterior of the wire protecting structure. For example, the clip may be an integrally formed part of the exterior of the wire protecting structure, such as geometry capable of cooperating with the box or a component located within the box. As should be appreciated by those having ordinary skill in the art, the wire protecting structure may be provided with the kit as a removable piece, or as a piece fixed to the box by a clip or some other attachment means, like, for example, a spot weld, a solder, or an adhesive.

Other aspects and features of the invention will become apparent to those having ordinarily skill in the art upon review of the following Description, Claims, and associated Drawings.

BRIEF DESCRIPTION OF THE DRAWINGS

FIG. 3 is a top view of an embodiment of the invention.
FIG. 4 is a side view of an embodiment of the invention.
FIG. 5A is a perspective side view of an embodiment of the invention.
FIG. 5B is a side view of an embodiment of the invention.
FIG. 5C is a side view of an embodiment of the invention.
FIG. 5D is a side view of an embodiment of the invention.

DETAILED DESCRIPTION OF THE INVENTION

Figure 1:
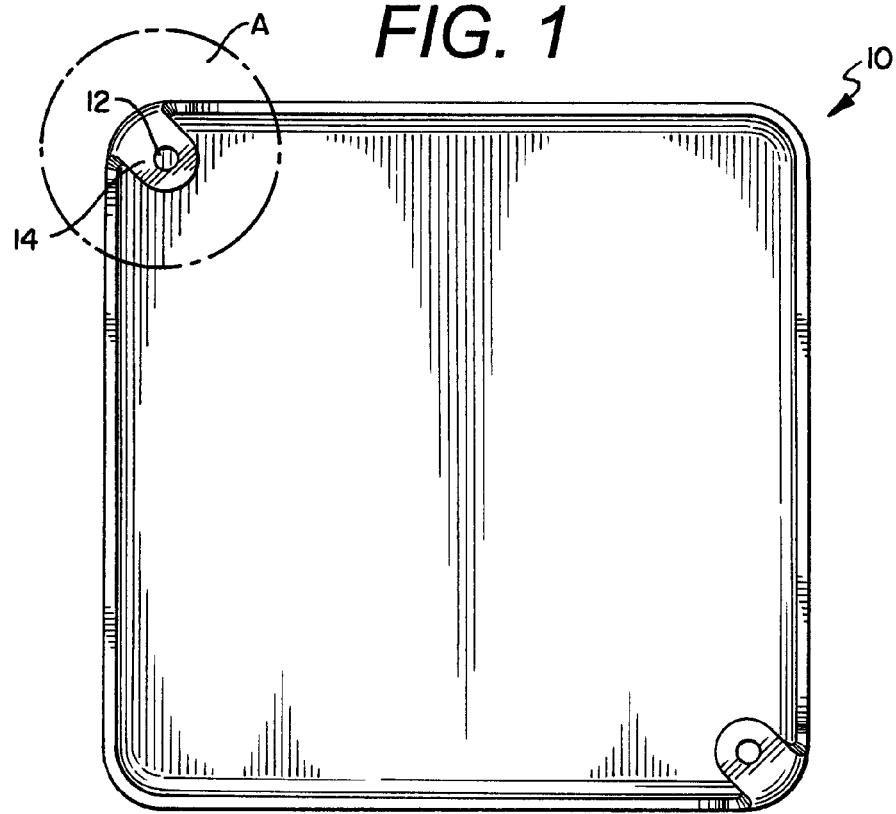
FIG. 1 is a top view of a standard electrical junction box.

As described herein, the present invention is directed to a wire protecting device (sometimes referred to as a "wire protecting structure," "protective structure," "protective sleeve," "sheath," or "insert sleeve") that is capable of being affixed to surfaces proximate to the existing fastener holes found in conventional electrical boxes, components in the electrical box, anything that attaches to an electrical box, or being provided as part of a kit for boxes that house electrical wires and/or components. An exemplary electrical box 10 having a fastener hole 12 surrounded by surface 14 is shown in FIG. 1.

Figure 2:
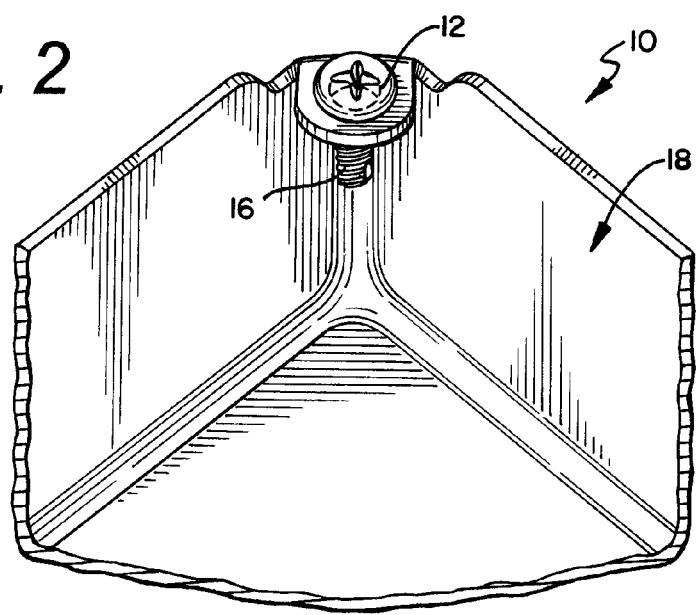
FIG. 2 shows an elevated perspective view of Portion A of FIG. 1 with a fastener fully interested through a fastener hole.

As shown in FIG. 2, in the prior art when a fastener, shown as screw 16, is fixed in the fully fastened position affixing, for example, a face plate or plaster ring to the front of the box (not shown), a majority of the fastener extends longitudinally into the area 18 of the box 10. In electrical boxes allowing a fastener like screw 16 to extend into area 18, a hazard is created wherein wires housed therein may become stripped, cut, or otherwise affected by the shank or tip of the fastener or by the tip thereof.

As will be explained in greater detail, the invention provides a wire protecting structure, either as an intrinsic element of an electrical box, a face-plate portion of an electrical box, electrical switches, receptacles, over-current protection enclosures, and other similar electrical devices, or as a retrofit component added to existing devices.

As shown in FIGS. 3-5, the present invention is directed to a wire protecting device 20 for boxes that house portions of electrical wires (not shown). Device 20 includes a protective structure 22 which has exterior 24 and penetrable interior 26. Device 20 further includes an attachment element 28 proximate one end of structure 22. Attachment element 28 allows device 20 to attach proximate a hole within an electrical box capable of receiving a fastening element.

Exterior 24 of structure 22 may be constructed of one of several materials including but not limited to steel, aluminum, brass, nylon, plastic or any other desirable material capable of enshrouding at least a portion of the circumference of a fastening element inserted into the electrical box. Preferably, the chosen material should have sufficient tensile strength to resist rupturing or splitting if a shank or tip or threads of a fastener come into contact with exterior 24 of structure 22. However, materials having a lesser tensile strength may be employed as exterior 24 so long as the material and/or shape of exterior 24 is capable of insuring that an inserted fastener remains isolated from wires located within the box.

As shown in FIGS. 3-5, penetrable interior 26 of structure 22 may be at least partially empty or hollow, or, may be filled with a material which is easily penetrated by a screw or other fastening device. For example, penetrable interior 26 of structure 22 may be at least partially filled with a gel-like substance through which a fastener can penetrate. In embodiments where necessary, the gel-like or similar substance may be a dielectric substance in order to prevent or avoid any unwanted electric transmission between wires and/or components housed in the box and the fastener. As should be appreciated by those having ordinary skill in the art, in situations where transmission between wires or components housed in the box and the fastener are a concern, the fastener itself and exterior 24 of structure 22 may be formed from a non-conductive material. In embodiments where penetrable interior 26 of structure 22 is hollow, the interior surface of exterior 24 may be either completely smooth, or sized and threaded to receive a standard screw or similar fastener therein.

Regardless of whether penetrable interior 26 of structure 22 is hollow, filled with a penetrable material, or some combination thereof, the penetrable portion of interior 26 is sufficiently sized to easily receive a fastener having a similar shape, length, and diameter to that of at least a standard screw. While it is contemplated by the invention to increase or decrease the size of penetrable interior 26 to accommodate larger fasteners or smaller electrical boxes, sizing penetrable interior 26 such that it is capable of receiving a standard screw or other similar standard fasteners allows for structure 22 to be retrofitted into any existing installation, and incorporated into any new installation, without having to change any parts or redesign boxes.

Though only shown as having a cylindrical shape, it is also contemplated by the invention that the exterior 24 of structure 22 may take any form capable of having at least a partially hollow interior. For example, exterior 24 of structure 22 may take the shape of an at least partially hollow cube, cone, pyramid, diamond or other shape that is necessary for a particular fastener or required due to the configuration of a specific electrical box.

As shown in FIGS. 3-5, the attachment element 28 may be a clip having arms 30, 32 attached in a perpendicular manner to one end of structure 22. In alternative embodiments, attachment element 28 may be attached in a parallel manner to the outer surface of exterior 24. As should be appreciated by those having ordinary skill in the art, attachment element 28 may be integrally formed as a part of exterior 24, or in the alternative may be connected at point 34 to exterior 24 via a hinge (see, for e.g., FIG. 5A), a spring, soldering, welding, or any other method known in the art. Attachment element 28 may also be made of a rigid, for e.g. steel, or resilient, for e.g. soft plastic, material, or may be a spring clip having memory capable of being deformed and returning to an "attached" position.

In alternative embodiments, like those shown in FIGS. 5B-5D, the attachment element 28 of structure 22 may be geometry 36 formed integrally as part of structure 22 which cooperates with a surface in an electrical box proximate a fastener hole. The geometry of the structure 22 and the location proximate the fastener hole in the electrical box should be such that structure 22 can be substantially locked into place proximate the fastener hole, and remain in place as a fastening element is inserted through the fastening hole and into the interior 26 of the structure 22. In such embodiments, attachment element 28 may be a gap 36 formed proximate one end of structure 22 (see, e.g., FIG. 5B), or may be a specific geometry designed to cooperate with a protrusion or receptacle in a component housed in the electrical box, or with the electrical box itself (see, e.g., protrusions 38 in FIG. 5D).

As should be appreciated by those having ordinary skill in the art, attachment means 28 may be anything which substantially allows structure 22 to attach proximate a fastener hole anywhere inside a box housing electrical wires in manner which insures that the fastener will extend into interior 26 of structure 22 when the fastener is in at least a partially fastened position. For example, as shown in FIG. 5C, in addition to those listed above, attachment element 28 may further include techniques or methods which directly attach structure 22 to a surface located proximate a fastener hole in an electrical box, including but not limited to: spot welding; applying an adhesive to structure 22 and/or the surface proximate the fastener hole; or soldering. In some embodiments, it may even be beneficial to have attachment element 28 formed directly as a portion of the surface having an aperture such that the aperture matches the penetrable interior of the insert sleeve and substantially aligns with a fastener hole.

Figure 6:
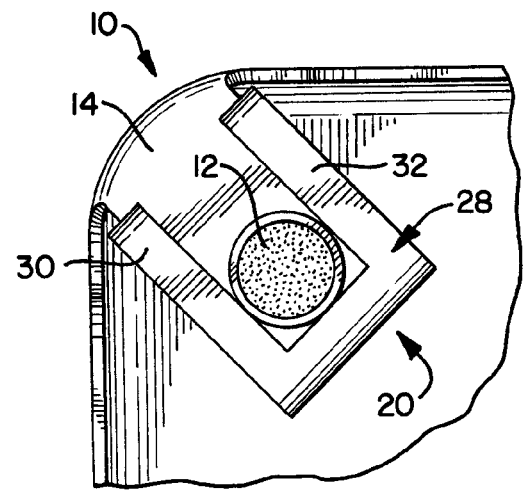
FIG. 6 is a top view of an embodiment of the present invention attached to a surface proximate the fastener hole located in, for example, portion A of FIG. 4.
Figure 7:
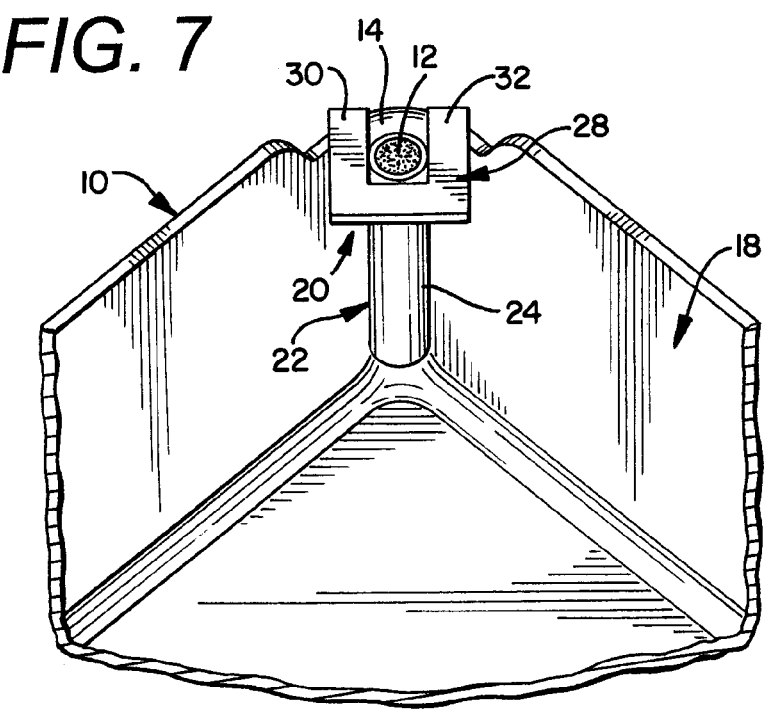
FIG. 7 is an elevated perspective view of FIG. 6.

As shown in FIG. 6, device 20 may be attached to surface 14 surrounding fastener hole 12 via attachment element 28 (shown in FIG. 6 as a clip). When viewed compared to FIG. 3, for example, the size of penetrable interior 26 relative to fastener hole 12 can be clearly seen insofar as penetrable interior 26 extends beyond the opening in attachment element 28 in FIG. 3, while fastener hole is completely within the opening in attachment element 28. As shown in FIG. 7, once device 20 is attached to surface 14, structure 22 is positioned to extend longitudinally into area 18 wherein electrical wires (not shown) may be housed within electrical box 10. When device 20 is attached, penetrable interior 26 of structure 22 substantially aligns with fastener hole 12 such that any fastener which is fastened through hole 12 is received within penetrable interior 26 and surrounded by exterior 24.

Figure 8A:
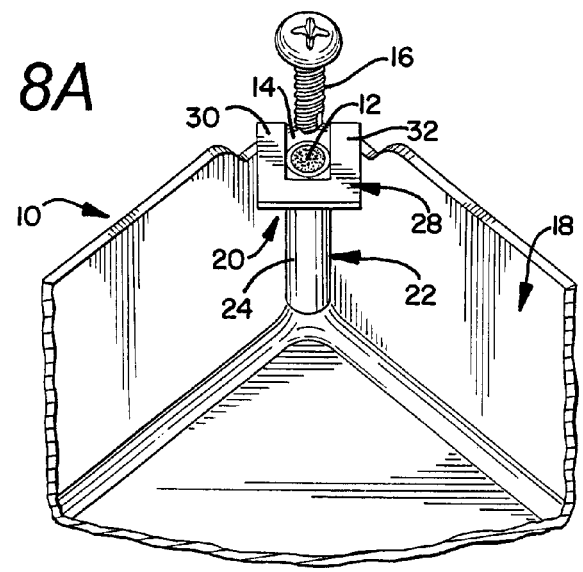
FIG. 8A is a perspective view of FIG. 7 with a fastener positioned for insertion into a fastener hole.
Figure 8B:
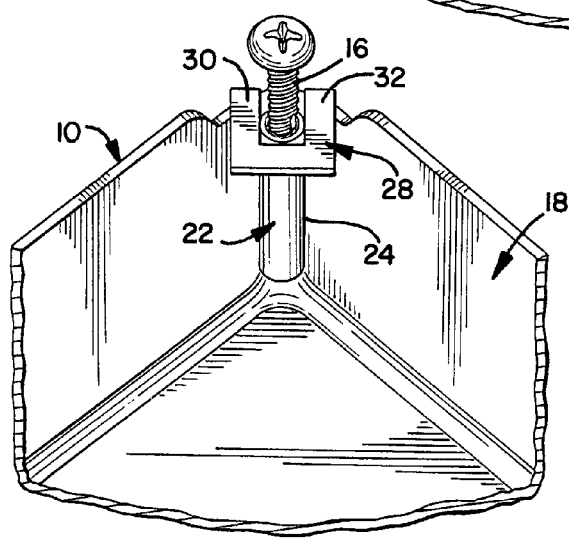
FIG. 8B shows the perspective view of FIG. 7 with a fastener partially inserted through a fastener hole.
Figure 8C:
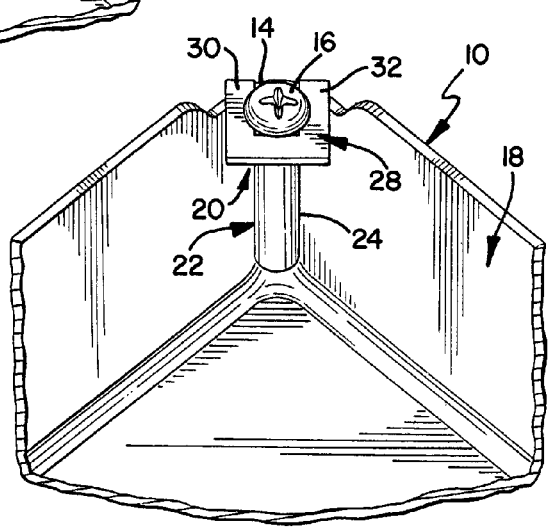
FIG. 8C is a perspective view of FIG. 7 with the fastener fully inserted through a fastener hole and enshrouded by the attached protective structure.

The progression of the fastening of a fastener into fastener hole 12 having a structure 22 attached proximate thereto can be seen in FIGS. 8A-8C. As seen in FIGS. 8B and 8C, unlike prior art electrical boxes (shown in FIG. 2), once the insertion of a fastener begins, for example screw 16 being screwed in, any portion which passes through fastener hole 12 is surrounded by exterior 24 and housed within penetrable interior 26. Throughout the entire fastening process, and once locked in place, structure 22 isolates the fastener or screw 16, from the remainder of the area 18 of box 10, preventing the possibility that the fastener strips, cuts, or otherwise effects any wires which may be housed within area 18.

The above-described embodiments of the present invention are intended to be examples only. Alterations, modifications and variations may be effected to the particular embodiments by those of skill in the art without departing from the scope of the invention, which is defined by the claims appended hereto.

What is claimed is:

1. A wire protecting device for use with electrical boxes, the device comprising:
    an insert sleeve having an exterior and a penetrable interior, the penetrable interior being bounded by a substantially smooth surface; and,
    an attachment element integrated with the insert sleeve, the attachment element being capable of attaching the insert sleeve to a surface proximate a fastener hole capable of receiving a fastener in an electrical box so that the penetrable interior of the insert sleeve substantially aligns with the fastener hole when the insert sleeve is attached to the surface proximate the fastener hole and is sized to receive and surround fasteners of different diameters.

2. The device of claim 1 wherein the penetrable interior of the insert sleeve is at least partially hollow.

3. The device of claim 1 wherein the penetrable interior of the insert sleeve is at least partially filled with a gel-like substance.

4. The device of claim 3 wherein the gel-like substance is a dielectric.

5. The device of claim 1 wherein the attachment element is a clip.

6. The device of claim 5 wherein the clip is attached to the insert sleeve in a perpendicular manner.

7. The device of claim 5 wherein the clip is integrally formed as part of the exterior of the insert sleeve.

8. The device of claim 5 wherein the clip is hingedly attached to the exterior of the insert sleeve.

9. The device of claim 5 wherein the clip is soldered to the insert sleeve.

10. The device of claim 5 wherein the clip is welded to the insert sleeve.

11. The device of claim 5 wherein the clip is made of a resilient material.

12. The device of claim 1 wherein the attachment element is an integrally formed geometry which cooperates with the surface proximate the fastener hole to attach the insert sleeve to the surface proximate the fastener hole.

13. The device of claim 12 wherein the attachment element is a gap formed proximate one end of the insert sleeve.

14. The device of claim 1 wherein the insert sleeve includes a portion capable of being spot welded to a surface proximate a fastener hole.

15. The device of claim 1 wherein the insert sleeve includes a portion capable of being adhered using an adhesive to a surface proximate a fastener hole.

16. The device of claim 1 wherein the insert sleeve includes a portion capable of being soldered to a surface proximate a fastener hole.

17. A kit for housing electrical wires and components, the kit comprising:
    a box having at least one through hole to which a fastener attaches;
    at least one fastener capable of attaching to the through hole; and,
    a wire protecting structure having an exterior and a penetrable interior, the penetrable interior being bounded by a substantially smooth surface, the wire protecting structure further including an attachment element for attaching to a surface proximate each of the at least one through holes, wherein the penetrable interior of the wire protecting structure has a greater width than the at least one through hole and being configured to receive and surround fasteners having different diameters.

18. The kit of claim 17 wherein the wire protecting structure is a hollow tube.

19. The kit of claim 17 wherein the wire protecting structure is provided with the kit as a removable element.

20. The kit of claim 17 wherein the wire protecting structure is provided as a fixed element attached to the box.

21. The kit of claim 17 wherein the attachment element is a clip.

22. The kit of claim 21 wherein the clip is hingedly attached to the exterior of the insert sleeve.

23. The kit of claim 21 wherein the clip is formed from a resilient material.

24. The kit of claim 17 wherein the attachment element is integrally formed with the exterior of the wire protecting structure.

* * * * *